United States Patent [19]

Sievenpiper

[11] 3,999,767

[45] Dec. 28, 1976

[54] PISTON RING SYSTEM

[75] Inventor: Ward Sievenpiper, Milgrove, N.Y.

[73] Assignee: A-T-O Inc., Willoughby, Ohio

[22] Filed: Sept. 9, 1974

[21] Appl. No.: 504,282

Related U.S. Application Data

[63] Continuation of Ser. No. 271,205, July 12, 1972, abandoned.

[52] U.S. Cl. .......................... 277/136; 277/188 R; 277/165
[51] Int. Cl.² .......................................... F16J 9/08
[58] Field of Search .......... 277/165, 156, 194, 188, 277/176, 136

[56] References Cited

UNITED STATES PATENTS

| 3,473,814 | 10/1969 | Bastow | 277/188 |
| 3,612,538 | 10/1971 | Sievenpiper | 277/165 |
| 3,614,114 | 10/1971 | Traub | 277/165 |

Primary Examiner—Samuel B. Rothberg
Attorney, Agent, or Firm—Christel & Bean

[57] ABSTRACT

A multiple element seal ring system comprising a pair of pressure non-deformable split rings and a deformable expander ring adapted to be received in a groove. The split rings are provided with relatively narrow inner surfaces spaced from the groove bottom wall to provide clearances of short axial extent therebetween for restricting deformation of the expander ring within its elastic limits.

6 Claims, 10 Drawing Figures

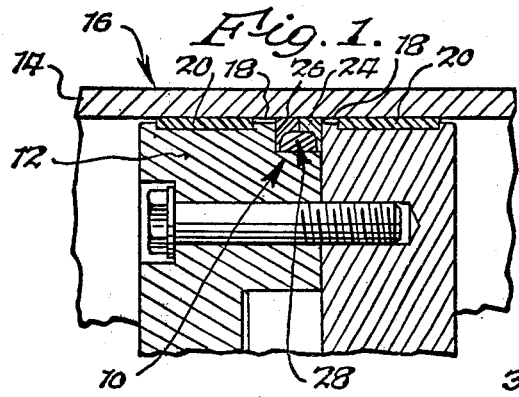
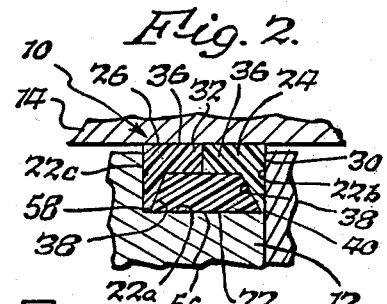
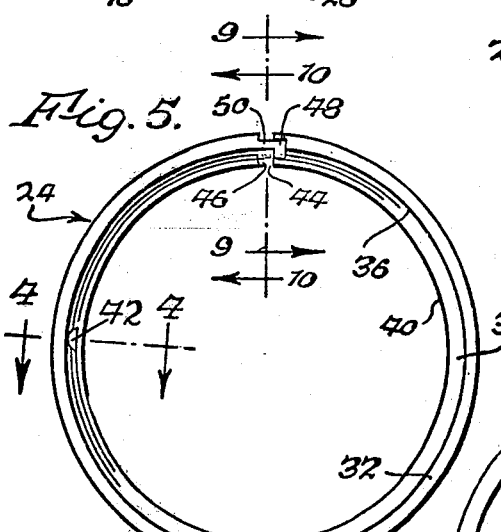
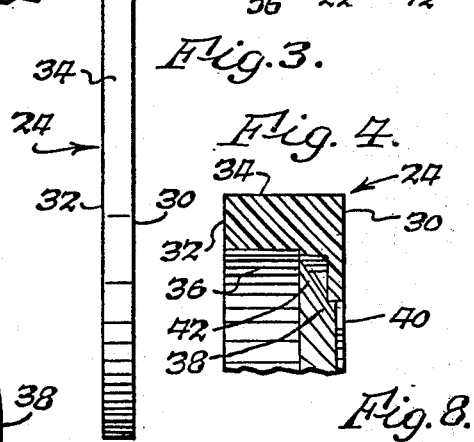
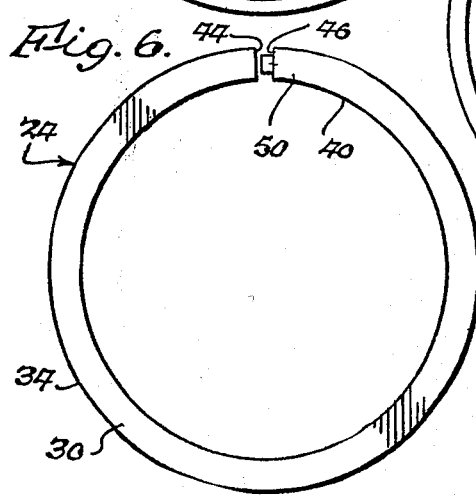
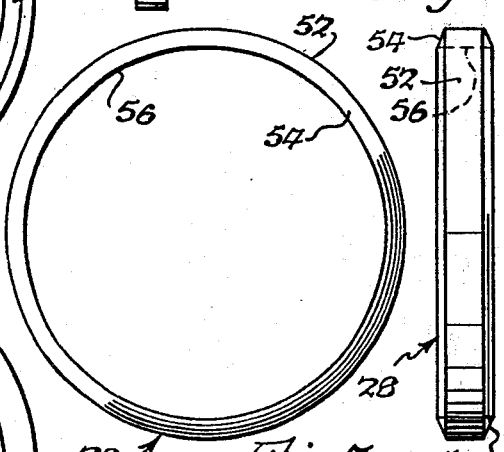
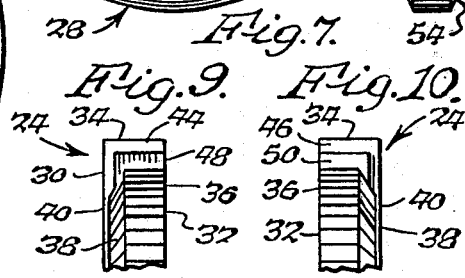

3,999,767

PISTON RING SYSTEM

This is a continuation of application Ser. No. 271,205 filed July 12, 1972, now abandoned.

BACKGROUND OF THE INVENTION

This invention relates to seal ring systems for fluid actuators and, more particularly, to seal ring systems of a composite design.

In recent times, the conventional O rings and chevron type packings employed in fluid actuators have been replaced by multiple element sealing arrangements including elements formed of both pressure deformable and non-deformable materials. While these multiple element sealing systems offer improvements over the O ring and chevron type seals, particularly in high pressure applications they do possess certain disadvantages. For example, in some known constructions, the deformable component, such as a rubber ring, is relied upon to perform some sealing and in contacting the other part is subject to wear. Often, metal rings, which do have a significantly long wear life, are used as the non-deformable components. However, they are susceptible to galling when performing the sealing function. In those systems in which split rings are utilized, fluid leakage or bypass often occurs through the ring partings at high pressures. One attempt to overcome these disadvantages is disclosed in U.S. Pat. No. 3,612,538, on a multiple element Piston Ring System, granted on Oct. 12, 1971 and assigned to the same assignee as the present invention. The present invention constitutes a further improvement in such a multiple element seal ring system and is directed to a construction positively preventing permanent deformation of the deformable expander ring.

SUMMARY OF THE INVENTION

A primary object of the present invention is to provide an improved multiple element seal ring system for fluid actuators which will remain leak-free under high pressure conditions and which is not susceptible to permanent deformation.

Another object of this invention is to provide the foregoing seal ring system with a deformable member and means restricting deformation thereof within the elastic limits of such deformable member.

The seal ring system of the present invention is characterized by the provision of a pair of split rings of pressure non-deformable material and an expander ring of pressure deformable material associated therewith. The non-deformable rings are provided with inner recesses for receiving the expander ring. Each of these inner recesses is defined in part by an inclined surface converging toward the outer planar surface of the split ring and joined thereto by a relatively narrow inner surface of a substantially knife edge thickness. This ring inner surface is spaced from the groove bottom wall to provide a short axial clearance into which the deformable ring can deform under pressure, the extent of such clearance limiting deformation of the expander ring within its elastic limits.

The foregoing and other objects, advantages and characterizing features of the present invention will become clearly apparent from the ensuing detailed description of an illustrative embodiment thereof, taken together with the accompanying drawing wherein like reference characters denote like parts throughout the various views.

BRIEF DESCRIPTION OF THE DRAWING FIGURES

FIG. 1 is a fragmentary, longitudinal sectional view of a portion of an hydraulic cylinder incorporating the seal ring system of the present invention;

FIG. 2 is a fragmentary, longitudinal sectional view similar to that of FIG. 1 but on a larger scale, illustrating the seal ring system constructed in accordance with this invention;

FIG. 3 is a side elevational view of one non-deformable split ring element of the seal ring system shown in FIG. 1;

FIG. 4 is a fragmentary cross sectional view, on an enlarged scale, of the ring element shown in FIG. 3;

FIG. 5 is a front elevational view, showing one face of the ring element of FIG. 3;

FIG. 6 is a rear elevational view, showing the opposite face of the ring element of FIG. 3;

FIG. 7 is a front elevational view of the deformable ring element of the seal ring system shown in FIG. 1;

FIG. 8 is a side elevational view of the deformable ring element of FIG. 7;

FIG. 9 is a fragmentary elevational, view, on an enlarged scale, taken about on line 9—9 of FIG. 5, showing one end of the split ring element of FIG. 5; and FIG. 10 is a fragmentary elevational view, on an enlarged scale, taken about on line 10—10 of FIG. 5, showing the other end of the split ring element of FIG. 5.

DETAILED DESCRIPTION OF AN ILLUSTRATED EMBODIMENT

Referring now in detail to the illustrative embodiment depicted in the drawing, there is shown in FIG. 1 a seal ring system or assembly, generally designated 10, constructed in accordance with this invention, and shown incorporated in a piston 12 mounted for reciprocating movement in a sleeve 14 of an hydraulic cylinder 16. While the piston shown in FIG. 1 is comprised of two components bolted together, it should be understood that seal ring systems 10 can be utilized with either multiple component or unitary pistons. A small gap or clearance 18 exists between the inner wall of sleeve 14 and the outer peripheral surface of piston 12. A pair of axially spaced sleeve type bearings 20 are mounted about piston 12 in bearing relation to the inner wall surface of sleeve 14.

As shown best in FIG. 2, a groove 22 is formed in piston 12 for receiving seal ring system 10, such groove being defined by a bottom wall surface 22a and spaced-apart side wall surfaces 22b and 22c. Of course, two or more grooves 22 with corresponding seal ring systems 10 can be provided in piston 12, as desired.

In accord with this invention, seal ring system 10 comprises first and second split rings 24 and 26, respectively, preferably formed of non-deformable material, such as synthetic plastic for example. Rings 24 and 26 are juxtapositioned in an axial abutting relation in groove 22 and the combined thicknesses or axial width of rings 24 and 26 is less than the axial width of groove 22. The cross sectional or radial width of each ring 24 and 26 is less than the depth of groove 22 or less than the cross sectional radial extent of groove 22.

Seal ring system 10 also includes an expander ring 28 (FIGS. 7 and 8) of resiliently yieldable, pressure deformable material, adapted to be positioned in an annular space defined by the groove bottom wall 22a and the inner surfaces of rings 24 and 26. Under pressure, expander ring 28 urges rings 24 and 26 radially outwardly to force the outer surfaces thereof into sealing engagement with the inner surface of sleeve 14.

Since rings 24 and 26 are of identical construction, although oriented in oppositely facing directions in the assembled relation shown in FIG. 1, it is believed that a detailed description of split ring 24 only will suffice, it being understood that the same reference characters designate identical parts. As shown in FIG. 3, ring 24 has parallel axial end faces 30 and 33 and an outer, circumferential bearing surface 34, joining faces 30 and 32 at sharp, right angular edges to provide an effective wiping engagement between bearing surface 34 and the inner wall surface of sleeve 14.

Ring 24 is provided with an annular recess extending inwardly of end face 32 and defined by an internal circumferential surface 36 (FIGS. 4 and 10) parallel to and concentric with bearing surface 34 and an inclined surface 38 tapering radially inwardly and toward end face 30. Tapering surface 38 terminates in a flat, inner surface 40 concentric with surfaces 34 and 36 and defining the inner periphery of ring 24. A semi-circular indentation or notch 42 (FIGS. 4 and 5) is provided in inclined surface 38 for a purpose to be explained.

As shown in FIGS. 5 and 6, split ring 24 is provided with a pair of parallel end faces 44 and 46 adapted to abut against each other in the closed position of ring 24. End face 44 is recessed, as shown at 48 in FIGS. 5 and 9, such recess 44 extending partially into circumferential surface 36 and inclined surface 38. Projecting forwardly from end face 46 is a lug member 50 receivable in recess 48 and having a configuration complementary thereto to form a lap joint construction. The lug and groove arrangement 48, 50 forming the lap joint construction maintains the free ends of split ring 24 in the properly aligned positions for effective sealing engagement of bearing surface 34 with the inner wall surface of sleeve 14 and also inhibits fluid leakage through the parting gap between ring ends 44 and 46.

Split rings 24 and 26 preferably are formed of a polyamide commonly known as Nylon and which is provided with a filler including glass fibers in an amount constituting about 30 percent by weight of the ring composition and molybdenum disulfide in an amount constituting about 5 percent by weight of the total ring material. These glass fibers add strength to the Nylon lengthening its useful wear life, and the molybdenum disulfide adds lubricity. While the above weight proportions of filler material are preferable, it has been found that the addition of glass fibers in a range of about 12 to 30 percent and molybdenum disulfide in a range of about 2 to 5 percent by total weight produces satisfactory results.

Nylon is preferable as the basic ring material because of its non-galling property. Also, Nylon has the capability of absorbing metallic impurities present in hydraulic fluid which would otherwise score and damage the cylinder. In addition, when Nylon is provided with the appropriate filler, it exhibits thermosetting characteristics, becoming permanently hard and rigid when heated or cured and will remain stable at temperatures up to 400° F and pressures up to 4,000 p.s.i., these conditions being well above those normally encountered in use. Ring 24 is molded to provide a protective skin against moisture and temperatures, which under extreme conditions, can render the ring material deformable. Although the ring material preferably is Nylon, it should be understood that other synthetic material having similar thermosetting properties and which do not exhibit "cold flow" under the temperature and pressure conditions normally encountered, can be used in lieu of Nylon, if desired, within the purview of this invention. As previously mention, split ring 26 is identical in construction to ring 24 and can be formed of the same material by the same mold.

Expander ring 28 is formed of a resiliently yieldable, pressure deformable material, such as neoprene for example. As shown in FIGS. 7 and 8, expander ring 28 comprises an annular, endless body provided with an outer, peripheral bearing surface 52 adapted to engage circumferential surfaces 36 of rings 24 and 26 and a pair of inclined or tapered axial end faces 54 engagable with and complementary to the inclined surfaces 38 of rings 24 and 26. Expander ring 28 also is provided with an inner peripheral surface 56 concentric with the outer peripheral surface 52 and concentric therewith.

When rings 24, 26 and 28 are assembled together and positioned in piston groove 22, as best shown in FIG. 2, the resulting seal ring system 10 maintains an effective fluid seal under both high and low pressure conditions while possessing low friction characteristics and no susceptibility to destructive pressure deformation. In this assembled relation, split rings 24 and 26 are oriented in a manner locating their respective gaps or partings between their respective ends 44 and 46 180° apart so that the gap of each split ring is adjacent the uninterrupted surface of the other split ring to eliminate any potential path for fluid bypass therethrough. Expander ring 28 has an interference fit with both the groove bottom wall surface 22a and the inner surfaces 36 of the recesses in rings 24 and 26. Expander ring 28 closes the small gap existing between the inner surfaces 40 of rings 24 and 26 and the groove bottom wall surface 22a and urges the bearing surfaces 34 of rings 24 and 26 radially outwardly into a fluid-tight, slidable sealing engagement with the inner wall surface of sleeve 14. The sharp, right angularly edges formed by the intersection of faces 30 and 32 with bearing surfaces 34, respectively, enhances this sealing engagement and also provides an effective wiping edge.

End faces 30 of each of the rings 24 and 26 have a radial dimension slightly less than the distance from the groove bottom wall surface 22a to the inner wall surface of sleeve 14 to provide a relatively large area exposed to axial loading under fluid pressure, thereby increasing the overall structural rigidity of seal ring system 10. This enables the plastic material of which the rings are formed to more effectively resist "cold flow" under high fluid pressure conditions. Moreover, this relatively large exposed area enhances the effectiveness of seal ring system 10 in contaminated hydraulic systems. It should be understood that for a hydraulic system to properly handle contaminated fluids, the width of clearance 18 between piston 12 and sleeve 14 should be relatively large. To this end, the large exposed areas of rings 24 and 26 increase the rigidity of seal ring system 10 against the increased axial stresses resulting from the larger clearance and also provide more surface area for exposure to the fluid to absorb the contaminating particles.

Since the inner surfaces 40 of rings 24 and 26 are slightly spaced from the groove bottom wall surface 22a to prevent interference therewith, a slight clearance 58 exists therebetween. An important feature of this invention resides in tapering the inner portions of rings 24 and 26 by means of inclined surfaces 38 to define relatively narrow inner surfaces 40 of substantially knife edge thicknessess to provide extremely short axial clearances 58 between such surfaces 40 and groove bottom wall surface 22a. While the width of each clearance 58 is sufficiently shallow to normally preclude "nibbling" or displacement of portions of deformable expander ring 28 into these clearances 59 under most pressure conditions, in the event such "nibbling" does occur under adverse pressure conditions, the short axial extent of such clearances 58 will restrict stretching of the displaced portions of expander ring 28 well within the elastic limits of the material of which ring 28 is formed. Accordingly, these deformed portions will not take a permanent set or deformation and expander ring 28 will restore itself to its initial shape upon removal of the pressures acting thereon.

In illustrating the operation of seal ring system 10, assume that fluid under pressure is applied to the right side of piston 12, as viewed in FIG. 1, to force the latter toward the left. Fluid pressure acting on end face 30 of split ring 24 causes the entire seal ring system 10 to move slightly axially to the left within groove 22. Of course, the extent of axial movement will be small due to the relatively small clearances between seal ring system 10 and the opposite side wall surfaces 22b and 22c of groove 22. However, this slight axial movement is sufficient to allow fluid under pressure to enter clearance 58 between the split ring narrow, inner surface 40 and groove bottom wall 22a to act on deformable expander ring 28. Ring 28 expands in both a radial direction and in an axial direction toward the left, as viewed in FIG. 1. Consequently, split rings 24 and 26 are urged radially outwardly into pressure sealing engagement against the inner wall surface of sleeve 14. Also, the seal between the inner surface 56 of expander ring 28 and groove bottom wall 22a is made tighter. In addition, the axial end face 30 of split ring 26 is pressed into firmer contact with groove sidewall 22c as a result of the axial expansion of expander ring 28. Since these axial stresses are distributed over the relatively large surface area of face 30 of ring 26, which surface area is several times the surface area of that portion of face 30 exposed to clearance 18, seal ring system 10 is able to resist cold flow into such clearance.

The expansion of ring 28 also causes portions thereof to bulge into notches 42 of split rings 24 and 26 and form an interlock therewith to resist relative rotation between these three components. Thus, these three components forming seal ring system 10 are held against relative rotation.

In the event that "nibbling" of expander ring 28 or the displacement of a portion thereof into clearance 58 takes place under the influence of high fluid pressures, this displaced or deformed portion will contact groove sidewall 22c before it is stretched beyond its elastic limits because of the short extent of clearance 58 as defined by the narrow, substantially knife edge thickness of ring inner surface 40. Accordingly, this displaced portion of expander ring 28 will not be permanently deformed and is restored to its natural condition upon removal of the fluid pressure.

From the foregoing, it is apparent that the objects of the present invention have been fully accomplished. By providing the split rings 24 and 26 with relatively narrow inner surfaces 40 of substantially knife edge thicknesses to define short axial clearances between the latter and the groove bottom wall surface, the degree of expander ring "nibbling" or deformation into such clearance is restricted within the elastic limits thereof to prevent permanent deformation.

A preferred embodiment of this invention having been described in detail, it should be understood that this has been done by way of illustration only without thought of limitation.

I claim:

1. A seal ring assembly having a pair of non-deformable rings disposed in an axial abutting relation and received in a peripheral groove having a bottom and side walls formed in a reciprocating member, said non-deformable rings having adjacent inner recesses defining a composite groove, outer bearing surfaces engageable with a surface to be sealed and inner surfaces slightly spaced from said bottom wall of said groove formed in said reciprocating member to define clearances therebetween, an expander ring of pressure deformable material comprising an annular body having smooth and continuous outer surfaces, said expander ring being received in said composite groove and having an inner surface adapted to engage said bottom wall of said groove in said reciprocating member, characterized in that the axial length of said inner surface on each of said non-deformable rings is of substantially knife edge thickness limiting the axial extent of said clearance available for displacement of portions of said expander ring within its elastic limits to prevent permanent distortion thereof, and said inner recesses of said non-deformable rings each being provided with a notch in the wall surface thereof adjacent to said expander ring for receiving a portion of said expander ring forced into said notch during expansion of said expander ring to form an interlock for preventing relative rotation between said rings.

2. A seal ring assembly according to claim 1, wherein said inner surfaces of said non-deformable rings are concentric with said outer bearing surfaces thereof; each of said non-deformable rings has a pair of parallel axial end faces joining said bearing surface at right angles thereto; each of said inner recesses of said non-deformable rings is defined by a surface extending inwardly of and normal to one of said end faces and an inclined surface extending from the inner end of said inwardly extending surface generally radially inwardly in coverging relation to the other end face; and said inclined surface and said other end face terminate in said non-deformable ring inner surface.

3. A seal ring assembly according to claim 2 wherein said notch is formed in said inclined surface of each of said non-deformable rings for receiving a portion of said deformable ring in the assembled relation to form said interlock therebetween.

4. A seal ring assembly according to claim 1 wherein said non-expander rings are formed of Nylon.

5. A seal ring assembly according to claim 1 wherein said deformable ring comprises an endless annular body having inclined axial end faces converging radially outwardly and complementary to the surfaces defining said composite groove.

6. A seal ring assembly according to claim 1 wherein each of said non-deformable rings is split to form opposed ends facing each other; one of said ring ends having an axial projection; the other ring end having a recess extending inwardly therefrom for receiving said projection to form a lap joint therebetween.

* * * * *